US008265574B2

(12) United States Patent
Karnik et al.

(10) Patent No.: US 8,265,574 B2
(45) Date of Patent: Sep. 11, 2012

(54) VOLTAGE REGULATOR WITH CONTROL LOOP FOR AVOIDING HARD SATURATION

(75) Inventors: Kiran Karnik, Kernersville, NC (US); Andrew Labaziewicz, Jamestown, NC (US)

(73) Assignee: TriQuint Semiconductor, Inc., Hillsboro, OR (US)

( * ) Notice: Subject to any disclaimer, the term of this patent is extended or adjusted under 35 U.S.C. 154(b) by 370 days.

(21) Appl. No.: 12/757,853

(22) Filed: Apr. 9, 2010

(65) Prior Publication Data

US 2011/0248693 A1 Oct. 13, 2011

(51) Int. Cl.
*H04B 1/04* (2006.01)
*G05F 1/56* (2006.01)

(52) U.S. Cl. .................................... 455/127.1; 323/280

(58) Field of Classification Search ............... 455/127.1, 455/127.2; 323/273, 274, 276, 277, 280, 323/282, 284
See application file for complete search history.

(56) References Cited

U.S. PATENT DOCUMENTS

| | | | | |
|---|---|---|---|---|
| 6,701,138 | B2 | 3/2004 | Epperson | |
| 7,095,257 | B2 | 8/2006 | Whittaker | |
| 7,170,269 | B1 | 1/2007 | Doyle | |
| 7,453,244 | B1 * | 11/2008 | Doyle | 323/280 |
| 7,622,902 | B1 * | 11/2009 | Kao et al. | 323/276 |
| 7,852,054 | B2 * | 12/2010 | Kao et al. | 323/277 |
| 7,902,801 | B2 * | 3/2011 | Mandal | 323/273 |
| 2008/0169795 | A1 * | 7/2008 | Wang | 323/280 |

* cited by examiner

*Primary Examiner* — Blane J Jackson
(74) *Attorney, Agent, or Firm* — Schwabe Williamson & Wyatt

(57) ABSTRACT

Embodiments of circuits, apparatuses, and systems for a voltage regulator with a control loop for avoiding hard saturation are disclosed. Other embodiments may be described and claimed.

20 Claims, 6 Drawing Sheets

VOLTAGE REGULATOR WITH CONTROL LOOP FOR AVOIDING HARD SATURATION

FIELD

Embodiments of the present disclosure relate generally to the field of circuits, and more particularly to a low dropout regulator with control loop for avoiding hard saturation.

BACKGROUND

Low dropout (LDO) voltage regulators are a class of linear voltage regulators that are specifically designed to operate with small differentials between an input voltage and an output voltage. A typical LDO voltage regulator will have a metal oxide semiconductor field effect transistor (MOSFET) connected between a supply voltage and an output voltage. The MOSFET may have a gate connected to an output of an operational amplifier and may be, along with one or more resistors, part of a feedback network for the operational amplifier.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific devices and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the present disclosure; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise.

In providing some clarifying context to language that may be used in connection with various embodiments, the phrases "A/B" and "A and/or B" mean (A), (B), or (A and B); and the phrase "A, B, and/or C" means (A), (B), (C), (A and B), (A and C), (B and C) or (A, B and C).

The term "coupled with," along with its derivatives, may be used herein. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled to each other.

Figure 1:
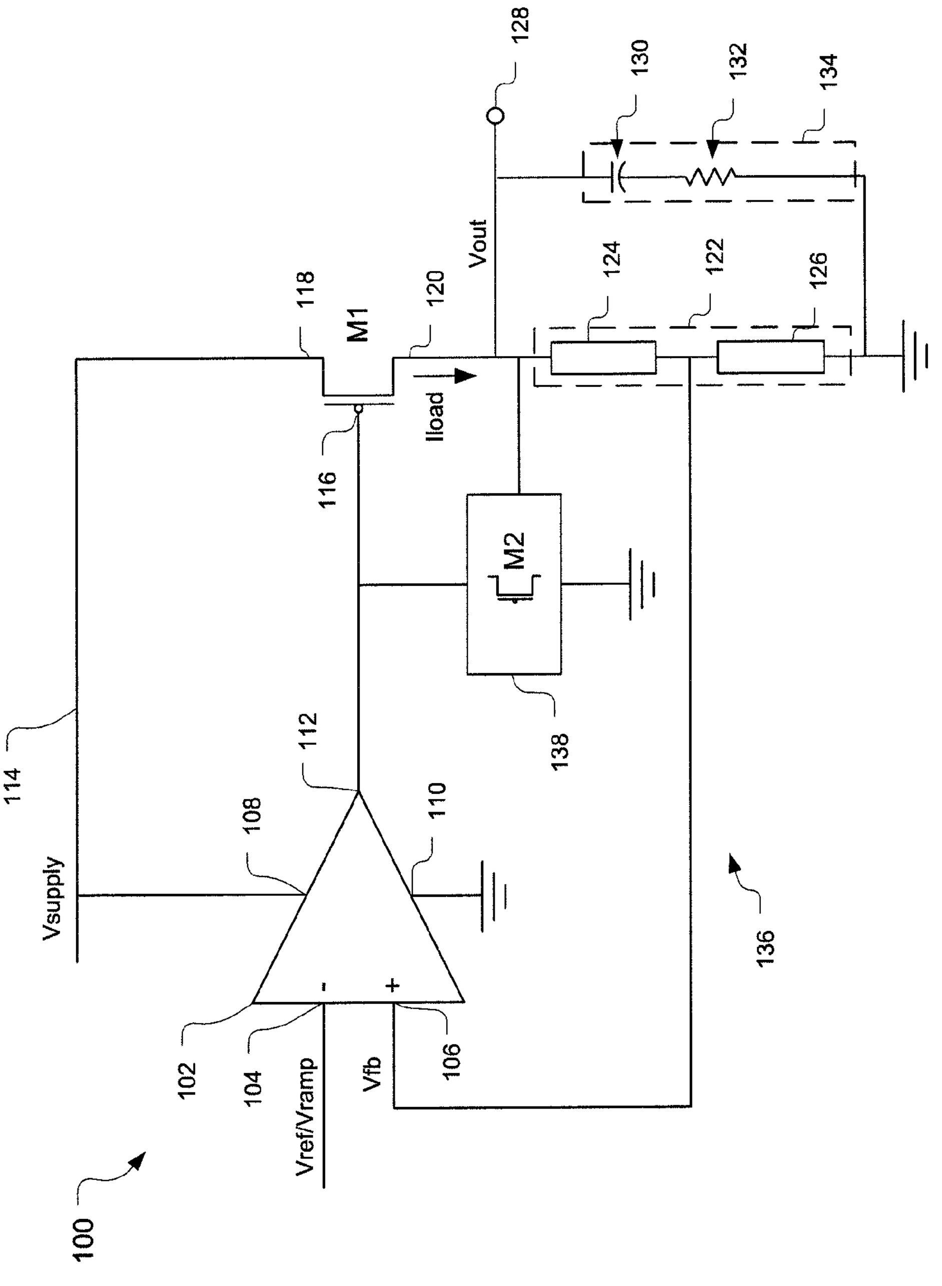
FIG. 1 illustrates a voltage regulator.

FIG. 1 illustrates a voltage regulator 100 in accordance with some embodiments of this disclosure. The voltage regulator 100, which may be an LDO voltage regulator in some embodiments, may include an operational amplifier (op amp) 102 having a first input, e.g., inverting input 104, a second input, e.g., non-inverting input 106, a positive power supply terminal 108, a negative power supply terminal 110; and an output 112. The inverting input 104 may be coupled with a reference or ramp voltage (Vref/Vramp). In general, a reference voltage may be considered to be a substantially constant voltage, while a ramp voltage may be a voltage that varies with time during operation of the voltage regulator 100. The non-inverting input 106 may be coupled with a feedback voltage (Vfb); the positive power supply terminal 108 may be coupled with a supply rail 114 that provides a supply voltage (Vsupply); and the negative power supply terminal 110 may be coupled with ground.

The voltage regulator 100 may also include a pass transistor M1. The pass transistor M1 may be a positive type (p-type) MOSFET, which may also be referred to as a "PMOS transistor," with a gate 116 coupled with the output 112 of the op amp 102; a source 118 coupled with the supply rail 114; and a drain 120 coupled with ground through a voltage divider 122. The voltage divider 122 may include components 124 and 126 coupled in series with one another. Components 124 and 126 provide series impedances that result in Vfb being a fraction of an output voltage (Vout) at output terminal 128.

Capacitor 130 and resistor 132 may represent electrical characteristics of an externally-connected load 134.

The voltage regulator 100, in general, may function to regulate Vout, e.g., to provide Vout at a substantially constant level for a given Vref/Vramp, notwithstanding variations in Vsupply. A feedback network 136, which includes the pass transistor M1 and the voltage divider 122, may provide Vfb to the op amp 102, which amplifies a difference between Vfb and Vref/Vramp and uses the amplified result to drive the pass transistor M1. The difference between Vfb and Vref/Vramp may be referred to as a differential input voltage, and the amplified result may be referred to as an amplified differential input voltage. If Vout is too low, which may result from a drop in Vsupply and/or an increase in load current (Iload), the op amp 102 may drive the pass transistor M1 to increase Vout. Conversely, if Vout is too high, the op amp 102 may drive the pass transistor M1 to decrease Vout.

Maintenance of a desired relationship between Vramp and Vout may allow implementations of a power module using the voltage regulator 100 to satisfy various time-mask and switching-spectrum targets. Some of these targets may not be reached if the desired relationship is not maintained with respect to certain conditions. This may be explained further with reference to FIG. 2.

Figure 2:
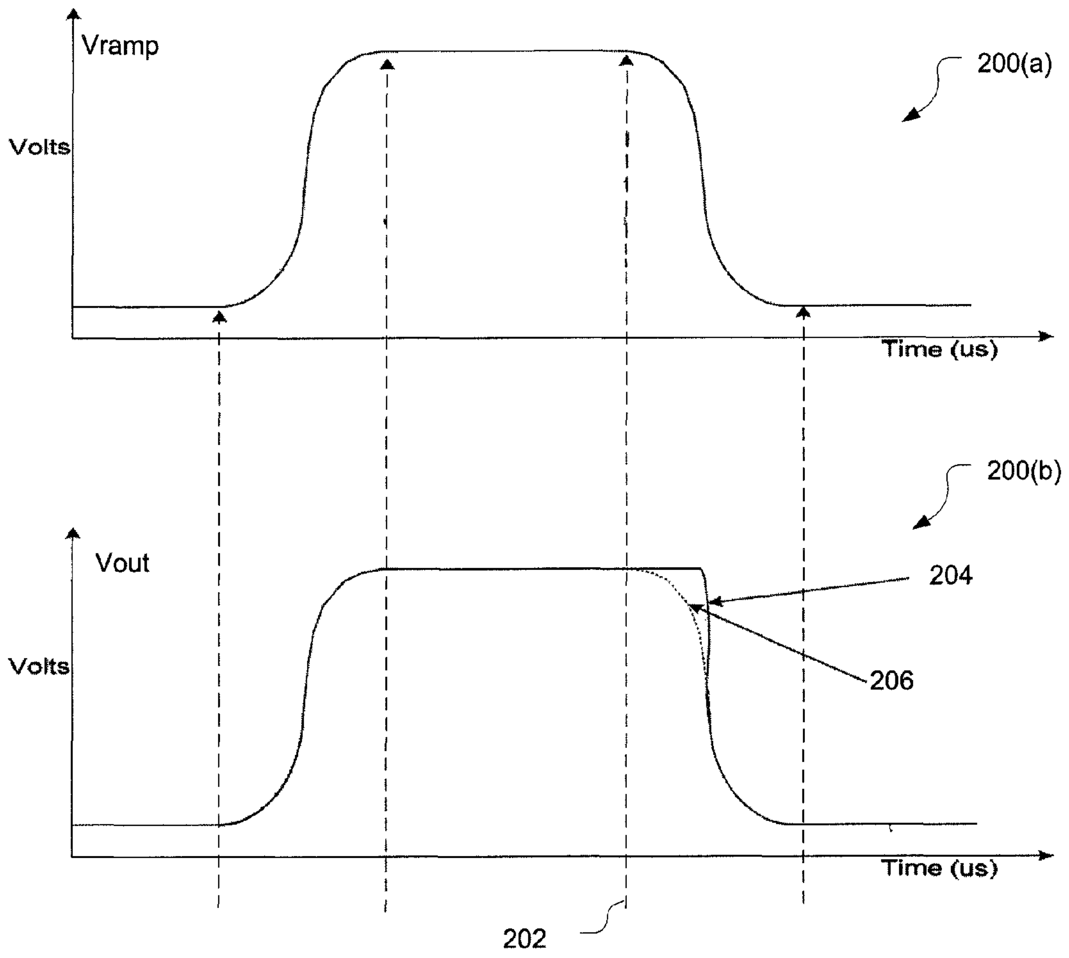
FIG. 2 illustrates graphs depicting operational characteristics of a voltage regulator.

FIG. 2 provides graphs 200(*a*) and 200(*b*) respectively showing Vramp and an associated Vout in accordance with some embodiments. In some conditions, e.g., low battery (i.e., Vsupply) conditions coupled with a high Vramp, a pass transistor of a voltage regulator may be pushed into a linear operating region, in which case it will operate as a resistor, and Vout will exceed a gate voltage of the pass transistor by more than a threshold of the pass transistor. If Vramp continues to increase, the voltage regulator may go into hard saturation and the gate of the pass transistor will have collapsed to ground potential. Then, when Vramp drops, at time 202, an op amp may need to charge a capacitance of the gate of the pass transistor before Vout responds in a desired manner and follows Vramp down. This is shown by the corner 204 of graph 200(*b*). When Vout does respond, it may do so by experiencing a near vertical drop, which may be undesirable in radio frequency communications. This lag in responsiveness of Vout to changes in Vramp, which may also be referred to as phase lag, may compromise the relationship between Vout and Vramp and reduce performance of a power module.

Referring again to FIG. 1, embodiments of the present disclosure include a control loop 138 to maintain a desired gate voltage at pass transistor M1 to prevent the voltage regulator 100 from going into hard saturation. The control loop 138 may include a sense transistor M2, which may be a PMOS transistor, to facilitate sensing of a condition associated with hard saturation of the voltage regulator 100 (hereinafter "a hard saturation condition"). Components of the control loop 138 including, e.g., the sense transistor M2, may then operate to maintain the desired gate voltage at the pass transistor M1 based on the sensing of the hard saturation condition.

Maintaining a desired gate voltage at the pass transistor M1 may prevent the voltage regulator 100 from going into hard saturation in conditions such as those described above. Thus, Vout may respond to changes in Vramp without the above-mentioned phase lag. This may result in Vout exhibiting a more gradual and responsive curve 206 shown in graph 200 (*b*).

The voltage regulator 100, as described, may be capable of robust operation over a large range of operating temperatures, e.g., from about −40 degrees Celsius (C) to about 120 degrees C., and over varying Vsupply values, e.g., from about 2.85 volts (V) to about 5.1 V. Furthermore, the voltage regulator 100 as described herein may also be capable of stable operation, e.g., being relatively free of oscillations, over the temperature and supply voltage ranges.

Figure 3:
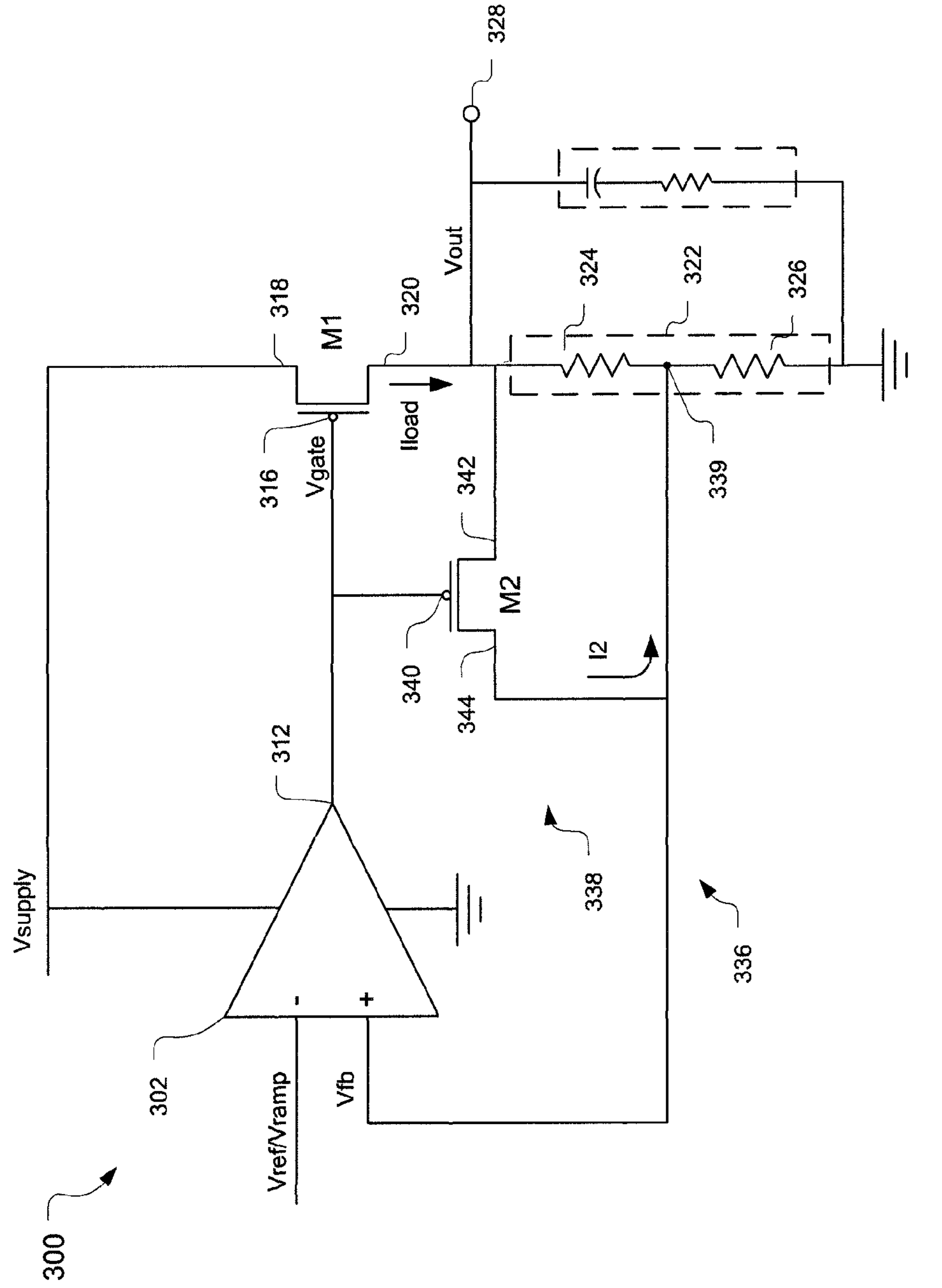
FIG. 3 illustrates another voltage regulator.

FIG. 3 illustrates a voltage regulator 300 in accordance with an embodiment. The voltage regulator 300 may be similar to voltage regulator 100 with like-named components operating in a similar manner except as otherwise described.

The voltage regulator 300 may include a control loop 338 having a sense transistor M2 with a gate 340 coupled with an output 312 of an op amp 302 and a gate 316 of the pass transistor M1; a source 342 coupled with an output terminal 328 and a drain 320 of the pass transistor M1; and a drain 344 coupled with a feedback node 339 on a feedback loop 336.

When the pass transistor M1 is operating in the saturation operating region, the sense transistor M2 may conduct zero current. In this state, Vout may be determined by:

$$V_{out} = V_{ramp/ref} * \left(1 + \frac{R1}{R2}\right), \qquad \text{Equation 1}$$

where R1 is a resistance of a resistor 324 of a voltage divider 322 and R2 is a resistance of a resistor 326 of the voltage divider 322.

As the pass transistor M1 enters the linear operating region, the sense transistor M2 may gradually begin to conduct current I2. Depending on a technology in which the op amp 302 is implemented, most or all of I2 may flow through the resistor 326 to ground. Hence, Vout may be determined by:

$$V_{out} = V_{ramp/ref} * \left(1 + \frac{R1}{R2}\right) - I2 * R1. \qquad \text{Equation 2}$$

From Equation 2, it may be seen that Vout may start to limit to a value below Vsupply, thus maintaining a desired gate voltage, Vgate, at the pass transistor M1. In this manner, the sense transistor M2 may sense a hard saturation condition and operate to maintain the desired Vgate by conducting I2 and feeding I2 to ground through the resistor 326, which will prevent Vgate from collapsing to ground.

Figure 4:
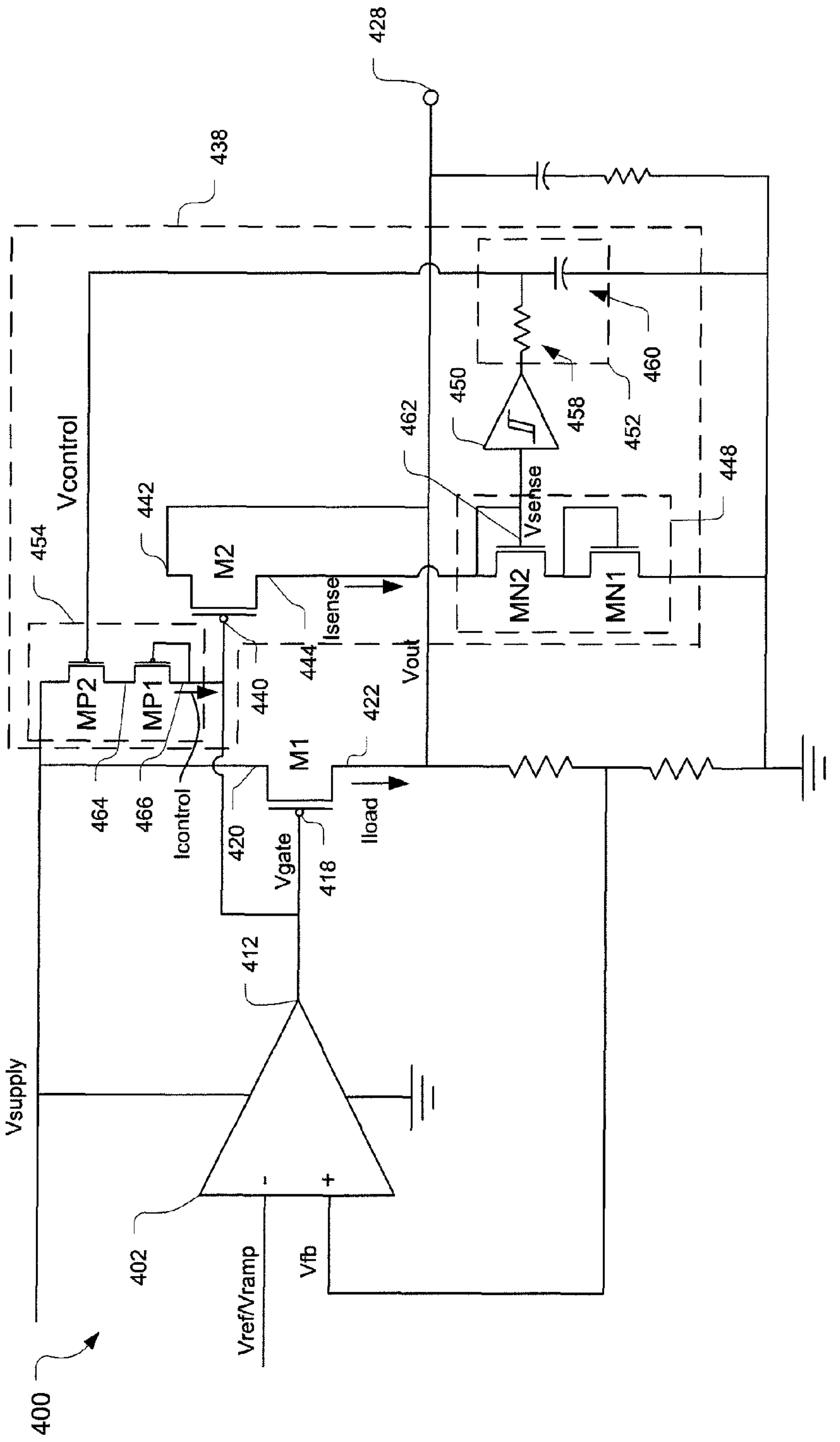
FIG. 4 illustrates another voltage regulator.

FIG. 4 illustrates a voltage regulator 400 in accordance with an embodiment. The voltage regulator 400 may be similar to voltage regulators 100 and/or 300 with like-named components operating in a similar manner except as otherwise described.

The voltage regulator 400 may have a control loop 438 that includes a sense transistor M2 coupled with a current to voltage (I-to-V) converter 448. The I-to-V converter 448 may include a pair of diode-coupled transistors, e.g., MN1 and MN2, coupled in series with one another as shown. The transistors MN1 and MN2 may be negative-type MOSFETS, which may also be referred to as NMOS transistors. The I-to-V converter 448, and the transistor MN2, in particular, may be coupled with a trigger 450. The trigger 450, which may be a Schmitt trigger, may be coupled with a filter 452. The filter 452 may include a resistor 458 and a capacitor 460 coupled with each other as shown. In this embodiment, the filter 452 may also be referred to as a resistor-capacitor filter. The filter 452 may be coupled with a control block 454 that includes two PMOS transistors, e.g., MP2 and MP1, coupled in series with one another as shown. While some specific circuit components are shown with respect to the control loop 438, other embodiments may employ other components that provide similar operations.

The sense transistor M2 may include a gate 440 coupled with an output 412 of an op amp 402 and gate 418 of the pass transistor M1. Both gates 418 and 440 may also be coupled with the control block 454. The sense transistor M2 may further include a source 442 coupled with an output terminal 428 and a drain 422 of the pass transistor M1; and a drain 444 coupled with the I-to-V converter 448.

If a voltage at the drain 422 of the pass transistor M1, i.e., Vout, is more than a threshold voltage above a voltage at a gate 418 of the pass transistor M1, i.e., Vgate, the pass transistor M1 may begin operating in a linear operating region and the voltage regulator 400 may approach a hard saturation condition. Given that the source 442 of the sense transistor M2 is coupled with the drain 422 of the pass transistor M1 and the gate 440 is coupled with gate 418, Vout being more than a threshold voltage above Vgate may also result in the sense transistor M2 conducting sense current Isense.

As Isense flows through the I-to-V converter 448, the transistors MN1 and MN2 may generate a Vsense, which corresponds to Isense, at a gate 462 of the transistor MN2. When Isense increases to a point that results in Vsense being greater than a trigger voltage of the trigger 450, which may correspond to a hard saturation condition, the trigger 450 may assert Vcontrol. In some embodiments, Vcontrol may be asserted low.

Vcontrol may be provided to the control block 454 through the filter 452, which may provide a smoothing function to prevent turning on/off the control block 454 too rapidly. When the output of the trigger 450 is asserted low, transistor MP2 may turn on and begin to conduct a control current, Icontrol, and short Vsupply to a source 464 of transistor MP1. Given that transistor MP1 is a diode-coupled transistor, a voltage at its drain 466, which is also Vgate, will be held to a gate-to-source voltage, Vgs, below Vsupply. In this manner, the control block 454 may clamp Vgate to a predetermined value from ground.

When Vout falls below a threshold voltage higher than Vgate, the sense transistor M2 may be turned off and Isense may be reduced to a point that Vsense may drop below the trigger voltage. This may cause the trigger 450 to be deasserted high, which turns off transistor MP2 and removes the clamp on Vgate.

In this manner, the sense transistor M2 may sense a hard saturation condition and the control block 454 may operate to clamp Vgate to a predetermined value from ground.

Figure 5:
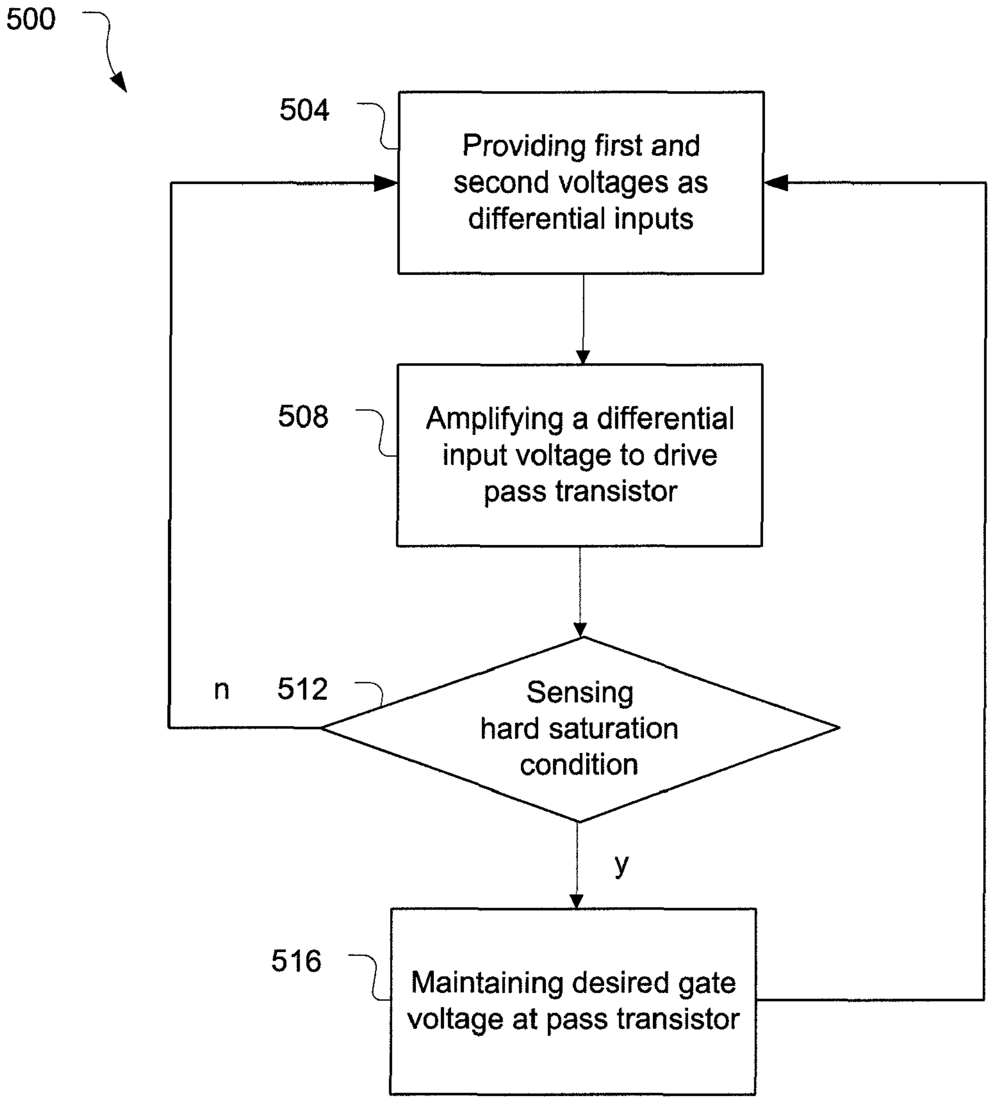
FIG. 5 is a flowchart illustrating operation of a voltage regulator.

FIG. 5 illustrates a flowchart 500 depicting operation of a voltage regulator, e.g., voltage regulator 100, 300, or 400, in accordance with some embodiments.

At block 504 ("Providing first and second voltages as differential inputs"), the operation may include providing two voltages, e.g., Vramp/Vref and Vfb, to an operational amplifier, e.g., op amp 102, as differential inputs. In some embodiments, e.g., as discussed below with respect to FIG. 6, the Vramp/Vref may be provided by a transceiver of an apparatus implementing the voltage regulator 100.

At block 508 ("Amplifying a differential input voltage to drive pass transistor"), the operation may include amplifying, e.g., by the op amp 102, a difference between two differential inputs of an operational amplifier. In this context, the op amp 102 may also be referred to as a differential amplifier. The amplified differential input voltage may be used to drive a pass transistor, e.g., pass transistor M1, which may provide Vout.

At block 512 ("Sensing hard saturation condition"), the operation may include sensing, e.g., by control loop 138, a hard saturation condition. This may be sensed by a sense transistor, e.g., sense transistor M2, with or without cooperation from other elements of a control loop.

If the hard saturation condition is not sensed at block 512, the operation may loop back to block 504. If the hard saturation condition is sensed at block 512, the operation may proceed to block 516 ("Maintaining desired gate voltage at pass transistor"). At block 516, the operation may include maintaining, e.g., by operation of the control loop 138, a desired gate voltage at a pass transistor. Maintenance of the desired gate voltage may be done as described with respect to FIGS. 3 and/or 4, discussed above. The operation may proceed back to block 504 after block 516.

Figure 6:
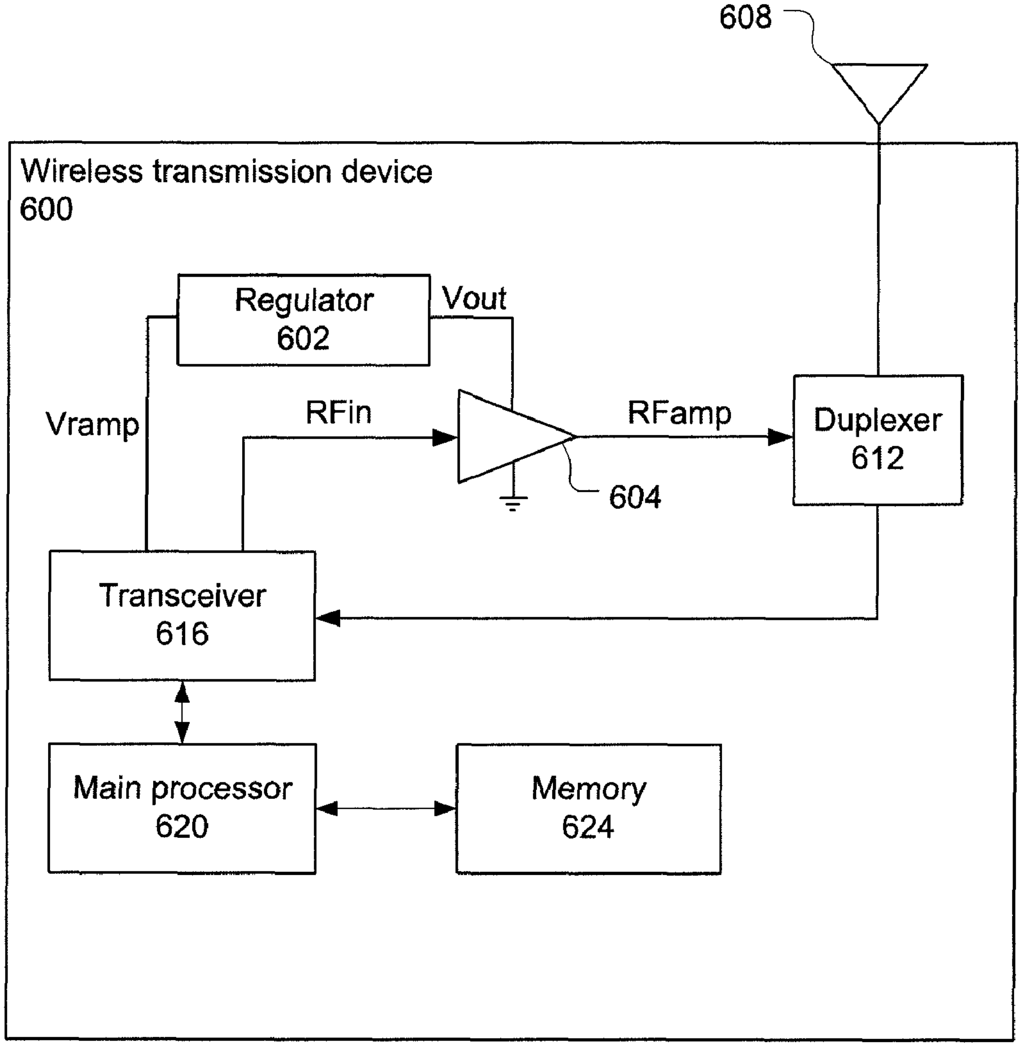
FIG. 6 illustrates a wireless transmission device implementing a voltage regulator, all in accordance with at least some embodiments.

Voltage regulators 100, 300, and/or 400 may be incorporated into any of a variety of apparatuses and systems. A block diagram of an exemplary wireless transmission device 600 incorporating a regulator 602, which may be similar to regulators 100, 300, and/or 400, is illustrated in FIG. 6. The wireless transmission device 600 (hereinafter also referred to as "device 600") may include a power amplifier 604, an antenna structure 608, a duplexer 612, a transceiver 616, a main processor 620, and a memory 624 coupled with each other as shown. While the device 600 is shown with transmitting and receiving capabilities, other embodiments may include wireless transmission devices without receiving capabilities.

In various embodiments, the device 600 may be, but is not limited to, a mobile telephone, a paging device, a personal digital assistant, a text-messaging device, a portable computer (e.g., a netbook, a laptop computer, etc.), a desktop computer, a telecommunications base station, a subscriber station, an access point, a radar, a satellite communication device, or any other device capable of wirelessly transmitting RF signals.

The main processor 620 may execute a basic operating system program, stored in the memory 624, in order to control the overall operation of the device 600. For example, the main processor 620 may control the reception of signals and the transmission of signals by transceiver 616. The main processor 620 may be capable of executing other processes and programs resident in the memory 624 and may move data into or out of memory 624, as desired by an executing process.

The transceiver 616 may receive outgoing data (e.g., voice data, web data, e-mail, signaling data, etc.) from the main processor 620, may generate the RFin signal to represent the outgoing data, and provide the RFin signal to the power amplifier 604. The transceiver 616 may also provide Vramp to the regulator 602. Vramp may be provided based on the power desired by the power amplifier 604, with the amplitude of Vramp dictating the output power. Vramp may vary over operation of the device 600. Variation of Vramp may be due, at least in some embodiments, to the device 600 switching between different amplification modes.

The power amplifier 604 may amplify the RFin signal in accordance with a selected amplification mode. The amplified RFamp signal may be forwarded to the duplexer 612 and then to the antenna structure 608 for an over-the-air (OTA) transmission. In various embodiments, the antenna structure 608 may include one or more directional and/or omnidirectional antennas, including, e.g., a dipole antenna, a monopole antenna, a patch antenna, a loop antenna, a microstrip antenna or any other type of antenna suitable for OTA transmission/reception of RF signals.

Those skilled in the art will recognize that the device 600 is given by way of example and that, for simplicity and clarity, only so much of the construction and operation of the device 600 as is necessary for an understanding of the embodiments is shown and described. Various embodiments contemplate any suitable component or combination of components performing any suitable tasks in association with the device 600, according to particular needs. Moreover, it is understood that the device 600 should not be construed to limit the types of devices in which embodiments may be implemented.

Although the present disclosure has been described in terms of the above-illustrated embodiments, it will be appreciated by those of ordinary skill in the art that a wide variety of alternate and/or equivalent implementations calculated to achieve the same purposes may be substituted for the specific embodiments shown and described without departing from the scope of the present disclosure. Those with skill in the art will readily appreciate that the teachings of the present disclosure may be implemented in a wide variety of embodiments. This description is intended to be regarded as illustrative instead of restrictive.

What is claimed is:

1. A voltage regulator comprising:

an operational amplifier having an output;

a pass transistor having a first gate coupled with the output of the operational amplifier, a first source coupled with a supply rail, and a drain coupled with an output terminal; and a control loop having a sense transistor with a second gate coupled with the output of the operational amplifier and a second source coupled with the drain of the pass transistor, the control loop configured to sense a condition and to maintain a desired gate voltage at the pass transistor based on the sensed condition.

2. The voltage regulator of claim 1, wherein the control loop comprises:

a converter coupled with the sense transistor and configured to receive a sense current from the sense transistor and to generate a sense voltage based on the sense current.

3. The voltage regulator of claim 2, wherein the converter comprises a pair of diode-coupled transistors coupled in series with one another.

4. The voltage regulator of claim 2, wherein the control loop further comprises:

a trigger coupled with the converter and configured to assert a control voltage based on the sense voltage.

5. The voltage regulator of claim 4, wherein the trigger comprises a Schmitt trigger.

6. The voltage regulator of claim 4, wherein the control loop further comprises:

a control block coupled with the trigger and the first and second gates and configured to clamp a voltage at the first gate of the pass transistor to a predetermined value from ground, based on an assertion of the control voltage, to maintain the desired voltage drop.

7. The voltage regulator of claim 6, wherein the control loop further comprises:

a filter coupled with the trigger and the control block and configured to provide a smoothing function to the control voltage provided to the control block.

8. The voltage regulator of claim 1, wherein the drain is a first drain and the voltage regulator comprises:

a feedback loop having a voltage divider with a first element, a second element, and a node between the first and second elements to provide a feedback voltage to an input terminal of the operational amplifier;

wherein the sense transistor includes a second drain coupled with the node.

9. The voltage regulator of claim 8, wherein the sense transistor is configured to provide a current to the second element based on the sensed condition.

10. The voltage regulator of claim 1, wherein the control loop comprises a control block coupled with the first and second gates, wherein the control loop is configured to clamp the gate voltage to a predetermined value from ground.

11. A method of providing a regulated output voltage comprising:

driving a pass transistor with an amplified differential input voltage, generated by an operational amplifier, to provide the regulated output voltage;

sensing, with a sense transistor of a control loop, a hard saturation condition, wherein the sense transistor has a source coupled with a drain of the pass transistor; and operating the control loop to maintain a desired gate voltage at the pass transistor based on said sensing of the condition.

12. The method of claim 11, wherein said operating the control loop comprises:

providing, with the sense transistor, a current to an element of a voltage divider of a feedback loop, based on said sensing of the condition.

13. The method of claim 11, wherein said operating the control loop comprises:

providing, with the sense transistor, a sense current based on said sensing of the condition;

asserting a control signal based on the sense current; and providing, with a control block based on said asserting of the control signal, a control current to clamp the gate voltage of the pass transistor to a predetermined value from ground.

14. The method of claim 13, wherein said operating the control loop further comprises:

filtering the control signal with a resistor-capacitor filter to provide a filtered control signal; and providing the filtered control signal to the control block.

15. The method of claim 13, wherein said asserting comprises:

receiving, with a trigger, a sense voltage based on the sense current; and asserting, with the trigger, the control signal based on a comparison of the sense voltage to a trigger voltage.

16. The method of claim 15, wherein said operating the control loop further comprises:

converting the sense current to the sense voltage.

17. A system comprising:

a voltage regulator having an operational amplifier to provide an amplified differential input voltage;

a pass transistor coupled with the operational amplifier and configured to provide a regulated output voltage based on the amplified differential input voltage; and a control loop including a sense transistor with a source coupled with a drain of the pass transistor, the control loop configured to sense a condition and to maintain a desired gate voltage at the pass transistor based on the sensed condition; and a power amplifier including a power input supply terminal coupled with the voltage regulator to receive the regulated output voltage, the power amplifier configured to amplify a radio frequency (RF) signal to be transmitted over the air.

18. The system of claim 17, further comprising:

a transceiver coupled with the voltage regulator and the power amplifier and configured to provide a ramp voltage to the voltage regulator and the RF signal to the power amplifier.

19. The system of claim 17, wherein the sense transistor is configured to provide a sense current based on a sensed condition and the control loop further comprises:

a control block configured to provide a control current based on the sense current to clamp the gate voltage of the pass transistor to a predetermined value from ground.

20. The system of claim 17, wherein the voltage divider further comprises:

a feedback loop having a voltage divider with a first element, a second element, and a node between the first and second elements to provide a feedback voltage to an input terminal of the operational amplifier;

wherein the sense transistor is coupled with the node and is configured to provide a sense current, based on a sensed condition, to the second element of the voltage divider.

* * * * *